L. Baker.
Horse Rake.
No. 6424.
Patented May 8, 1849.
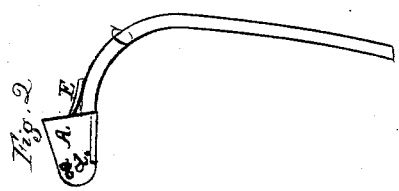
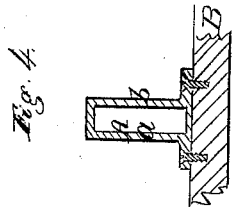
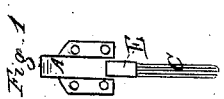
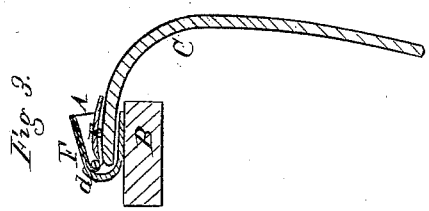

UNITED STATES PATENT OFFICE.

LYMAN BAKER, OF NEWBURY, NEW HAMPSHIRE.

IMPROVEMENT IN SPRING RAKE-TEETH.

Specification forming part of Letters Patent No. 6,424, dated May 8, 1849.

*To all whom it may concern:*

Be it known that I, LYMAN BAKER, of Newbury, in the county of Merrimack and State of New Hampshire, have invented a new and useful improvement in the mode of applying spring-teeth to the rake-head of a horse-rake or hand-rake; and I do hereby declare that the same is fully described and represented in the following specification and accompanying drawings, letters, figures, and references thereof.

Of the said drawings, Figure 1 is a top view of my improved spring-tooth and socket. Fig. 2 is a side elevation of it. Fig. 3 is a longitudinal and vertical section of it and the rake-head. Fig. 4 is a cross-section of the socket and part of the rake-head.

My invention is intended to overcome the difficulties which are experienced in the mode of applying or affixing a spring-tooth to a rake-head, which is described and claimed in Letters Patent granted by the Commissioner of Patents of the United States of America on the 14th day of March, 1846, to Seneca Ladd. A serious difficulty attending the operations of a rake having its teeth constructed and applied to the beam or rake-head according to the mode patented by the said Ladd, which difficulty must be obvious to every person who has had occasion to use such a rake, consists in the liability of the hay to catch and accumulate between the tooth and the staple and on the spring, and often to such extent as to prevent the return of the spring against the staple. The tooth is also subjected to a constant lateral looseness or shake, and receives its lateral support mainly from the bearing of the spring against the side or sides of the staple. The manner in which the spring is placed causes it to be so exposed that hay, brush, or other matters are liable to get caught between it and the rake-head, and thereby obstruct its operation.

In my improved mode of applying the spring-tooth to the rake-head I make use of a box or socket, A, which is made and screwed down upon the top surface of the rake-head B, as represented in the drawings. The said box or socket has one end—viz., its rear end—open, and receives through the open end the upper end of the bent tooth C, through which and the two sides $a$ $b$ of the socket a joint-pin, $d$, passes in such manner as to enable the tooth C to play or turn up and down thereon. A bent or angular spring, E E', formed of two legs or parts, is placed within the box or socket A and over the tooth C, one of its legs—viz., E—being made to rock and bear against the tooth C, while the other is supported against the top part of the socket, the said spring being held in position by a pin, $e$, which passes through the side of the socket. The socket or chamber which contains the tooth is made of a width just sufficient to admit of a free and uninterrupted play or movement of the tooth in a vertical plane. It therefore sustains the tooth in lateral directions and prevents any of the looseness or shake above alluded to. Besides this, the socket so covers the spring and is so placed—viz., on the top of the rake-head—as to render it very difficult, if not impossible, for hay to obstruct the correct operations of the tooth or spring.

I lay no claim to the mode of applying each of the teeth to the beam or head of a rake—viz., by the joint, spring, and staple—in combination with each other and acting together, as specified in the patent of Seneca Ladd; but What I do claim as my invention is—

My improved mode of applying each tooth to the rake-head—that is, the combination of the spring-socket, spring, and tooth, as arranged, constructed, and applied together and to the rake-head, substantially as specified.

In testimony whereof I have hereto set my signature this 18th day of December, A. D. 1848.

LYMAN BAKER.

Witnesses:
SAMUEL JONES,
ELIZA A. CRESSY.